May 23, 1950
G. J. SCHLOER
2,508,894
DIRECTION LOCATING DISK
Filed April 18, 1947
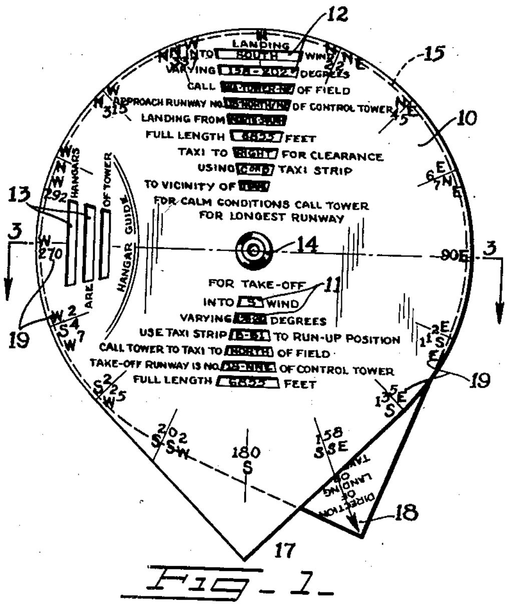
FIG. 1
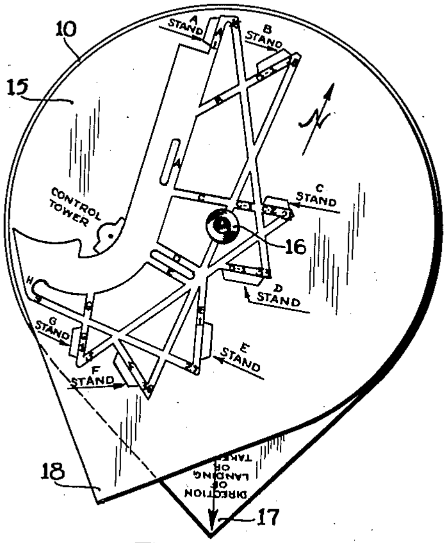
FIG. 2
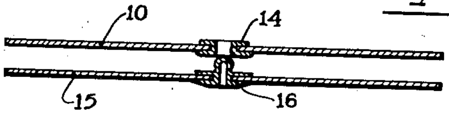
FIG. 3
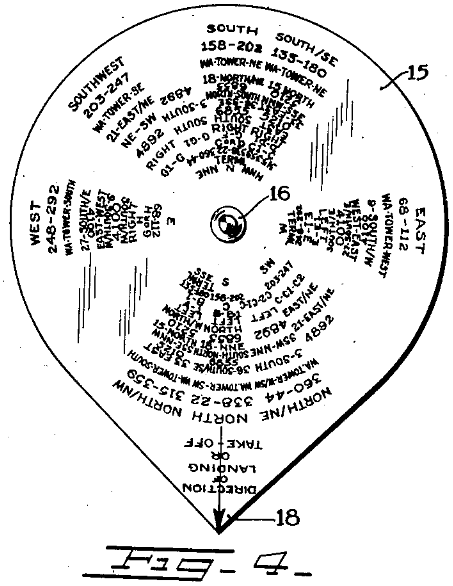
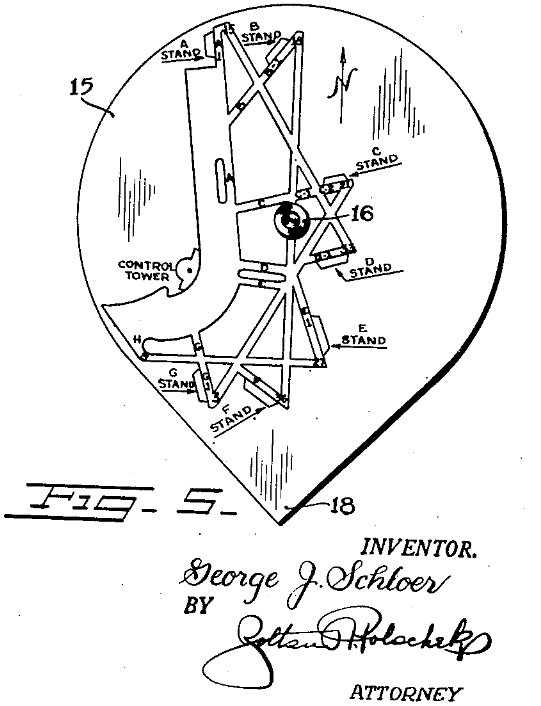
FIG. 4
FIG. 5
INVENTOR.
George J. Schloer
BY
Zoltan J. Polachek
ATTORNEY Patented May 23, 1950

2,508,894

UNITED STATES PATENT OFFICE 2,508,894

DIRECTION LOCATING DISK

George J. Schloer, Brooklyn, N. Y.

Application April 18, 1947, Serial No. 742,289

1 Claim. (Cl. 235—88)

The present invention relates to direction locating discs and it consists in the combinations, constructions and arrangements of parts herein described and claimed.

Generally, the invention comprises a device consisting of a single face disc with which may be associated any number of backing discs each of which bears indicia relating to a particular air field together with a map or chart of such field on the reverse side thereof and each having means for being removably attached in a revoluble manner with the face disc.

It is accordingly an object of the invention to provide a master disc capable of use for computation with a plurality of discs bearing specialized information.

Another object of the invention is the provision of means for quickly and easily detaching and attaching a specialized or minor disc with a master disc.

A further object of the invention is the provision of means whereby a pilot may speedily and exactly secure specialized information with regard to a particular airport.

A further object of the invention is the provision of a device of the character referred to above which will be easy to manufacture and which will be simple in construction and furthermore capable of simple ready understanding.

For further comprehension of the invention, and of the objects and advantages thereof, reference will be had to the following description and accompanying drawing, and to the appended claim in which the various novel features of the invention are more particularly set forth.

In the accompanying drawing forming a material part of this disclosure:

Fig. 1 is a plan view of a completely assembled device embodying the invention.

Fig. 2 is a view similar to Fig. 1 but showing the reverse side thereof.

Fig. 3 is an enlarged exploded sectional view taken substantially along line 3—3 of Fig. 1.

Fig. 4 is a plan view of one side of an element of the invention.

Fig. 5 is a view similar to Fig. 4 but showing the reverse side thereof.

Referring more particularly to the drawings, there is shown therein a computator comprising a master disc 10 having a series of openings 12 cut therein and referring to landing data, a series of openings 11 referring to take off data and a series of openings 13 referring to data relative to hangars and the like.

Removably attached to the master disc 10 is a disc 15 bearing data relative to a particular airport and which latter disc will be hereinafter referred to as a "minor" disc. The master disc 10 is provided with a snap fastener element 14 releasably engaged by a cooperating snap fastener element 16 on the minor disc 15 for releasably attaching the discs together.

The discs 10 and 15 are each formed with a pointed portion 17 and 18, respectively, and the master disc is provided with compass indications 19 about its periphery.

A plurality of minor discs 15 are interchangeably usable with the master disc 10, and the front sides of the minor discs are provided with data which may be selectively viewed through the openings 11, 12 and 13 of the master disc 10, depending upon the placing of the pointed sections 17 and 18 with respect to each other. The rear sides of the minor discs 15 are provided with charts in miniature, of the particular field or airport to which the data on the front sides refer.

In operation, it will be apparent that when a pilot is desirous of securing information about a certain airport or field, it is only necessary for him to select from his collection a minor disc 15 bearing the data concerning that field. He may then snap the chosen minor disc 15 to the master disc 10 and then revolve the two discs relative to each other to secure the proper setting, as for example, the pointed section 18 may state that the direction of landing or take-off is in a certain direction and bear an arrow to that effect. The pilot thus setting the known prevailing wind direction, has effectively produced a compass heading and readings 19. The back or minor chart will then give him a map or chart of the particular field and the minor arrow 17 on the reverse side of master disc 10 indicates the course of approaches and take-offs, and then secure whatever information he may need from readings taken through the openings or windows 11, 12 and 13. The back of the minor discs 15 will then give him a map or chart of the particular field or airport.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

A computing device, comprising a master disc formed with a plurality of window openings with appropriate indicia regarding airport conditions alongside the window openings, a minor disc disposed concentrically beneath said master disc and imprinted on its face adjacent said master disc with indicia viewable through said window openings in different turned positions of said minor disc relative to said master disc, a snap fastener element on said master disc, and a complementary snap fastener element on said minor disc turnably and releasably engaging said snap fastener element of said master disc, whereby said minor disc can be turned relative to said master disc to align desired indicia of said minor disc with the window openings of said master disc or said minor disc can be removed from said master disc to be interchanged with other minor discs when desired.

GEORGE J. SCHLOER.

REFERENCES CITED

The following references are of record in the file of this patent:

UNITED STATES PATENTS

| Number | Name | Date |
|---|---|---|
| 381,703 | Kraetzer | Apr. 24, 1881 |
| 1,346,929 | Zion | July 20, 1920 |
| 1,441,914 | Deisch | Jan. 9, 1923 |
| 2,033,385 | McCallum | Mar. 10, 1936 |